United States Patent
Sharma et al.

(10) Patent No.: US 9,491,758 B2
(45) Date of Patent: Nov. 8, 2016

(54) SYSTEM FOR ALIGNMENT OF RF SIGNALS

(71) Applicants: Ajay Sharma, Delhi (IN); Gopikrishna Charipadi, Bangalore (IN); Loksiva Paruchuri, Noida (IN)

(72) Inventors: Ajay Sharma, Delhi (IN); Gopikrishna Charipadi, Bangalore (IN); Loksiva Paruchuri, Noida (IN)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 122 days.

(21) Appl. No.: 14/681,047

(22) Filed: Apr. 7, 2015

(65) Prior Publication Data

US 2016/0302194 A1    Oct. 13, 2016

(51) Int. Cl.
*H04W 72/04* (2009.01)
*H04W 88/08* (2009.01)
*H04L 5/00* (2006.01)

(52) U.S. Cl.
CPC ....... *H04W 72/0446* (2013.01); *H04W 72/042* (2013.01); *H04L 5/0053* (2013.01); *H04W 72/0413* (2013.01); *H04W 72/0453* (2013.01); *H04W 88/08* (2013.01)

(58) Field of Classification Search
CPC .............................................. H04W 72/0446
See application file for complete search history.

(56) References Cited

U.S. PATENT DOCUMENTS

| | | | | |
|---|---|---|---|---|
| 5,657,358 A * | 8/1997 | Panech | ................. | H04W 52/20 370/330 |
| 5,745,777 A * | 4/1998 | English | ................. | H04H 20/12 375/228 |
| 8,081,942 B1 * | 12/2011 | Lee | ...................... | H04B 1/1027 455/212 |
| 8,325,865 B1 * | 12/2012 | Rofougaran | ........... | H04B 1/001 375/316 |
| 8,718,102 B2 | 5/2014 | Kim et al. | | |
| 9,112,471 B1 * | 8/2015 | Jain | ...................... | H03G 3/3052 |
| 2006/0120441 A1 * | 6/2006 | Nakagawa | ......... | H04B 1/71637 375/152 |
| 2007/0129034 A1 * | 6/2007 | Adams | ................. | H03G 3/3068 455/138 |
| 2007/0149206 A1 | 6/2007 | Wang | | |
| 2007/0178875 A1 * | 8/2007 | Rao | ................... | H04W 56/0035 455/343.1 |
| 2009/0168848 A1 * | 7/2009 | Constantinidis | ....... | H04B 1/707 375/140 |
| 2009/0168939 A1 * | 7/2009 | Constantinidis | .... | H04W 52/028 375/359 |
| 2010/0061361 A1 | 3/2010 | Wu | | |
| 2010/0171659 A1 * | 7/2010 | Waters | ................... | H04B 17/24 342/357.74 |
| 2011/0102258 A1 * | 5/2011 | Underbrink | ............ | G01S 19/37 342/357.47 |
| 2011/0223932 A1 | 9/2011 | Hole et al. | | |
| 2012/0014371 A1 | 1/2012 | Weng et al. | | |
| 2012/0313817 A1 * | 12/2012 | Underbrink | ............ | G01S 19/37 342/357.72 |
| 2013/0258959 A1 | 10/2013 | Dinan | | |
| 2014/0270024 A1 | 9/2014 | Papadimitriou | | |

\* cited by examiner

*Primary Examiner* — Andrew Lai
*Assistant Examiner* — Andrew C Lee
(74) *Attorney, Agent, or Firm* — Charles E. Bergere

(57) ABSTRACT

A radio-frequency (RF) transceiver for aligning a time offset (TO) of RF signals transmitted to the RF transceiver by a user equipment (UE) includes first and second processors and first and second system memories. The first processor provides values of a cool-off period, a reset interval, a filter period, a first filter, and a primary threshold to the second processor. The second processor generates a second filter value, first and second threshold values, an instantaneous TO value, and a TO value. The second processor transmits a default TO value and a modified TO value as the TO value to the first processor during first and second time periods, respectively. The first processor generates a control signal based on the TO value. The second processor transmits the modified TO value to the UE based on the control signal.

20 Claims, 9 Drawing Sheets

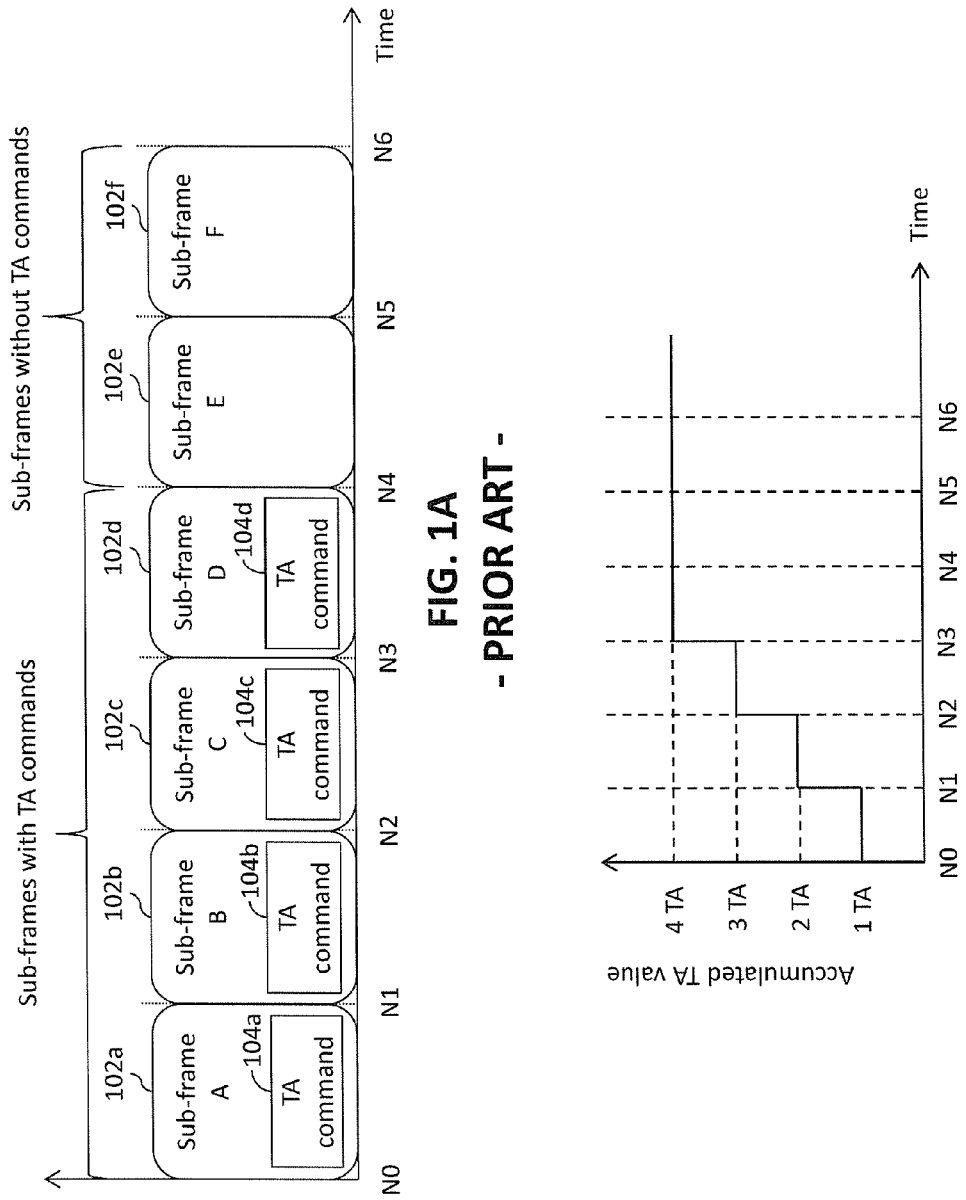

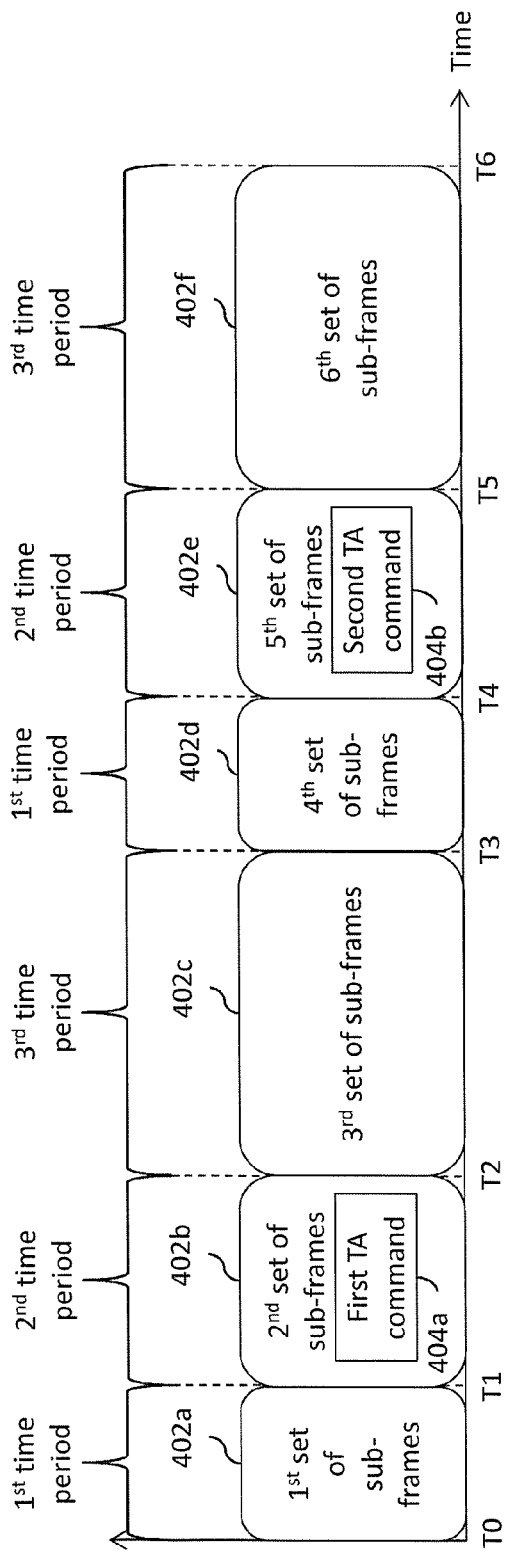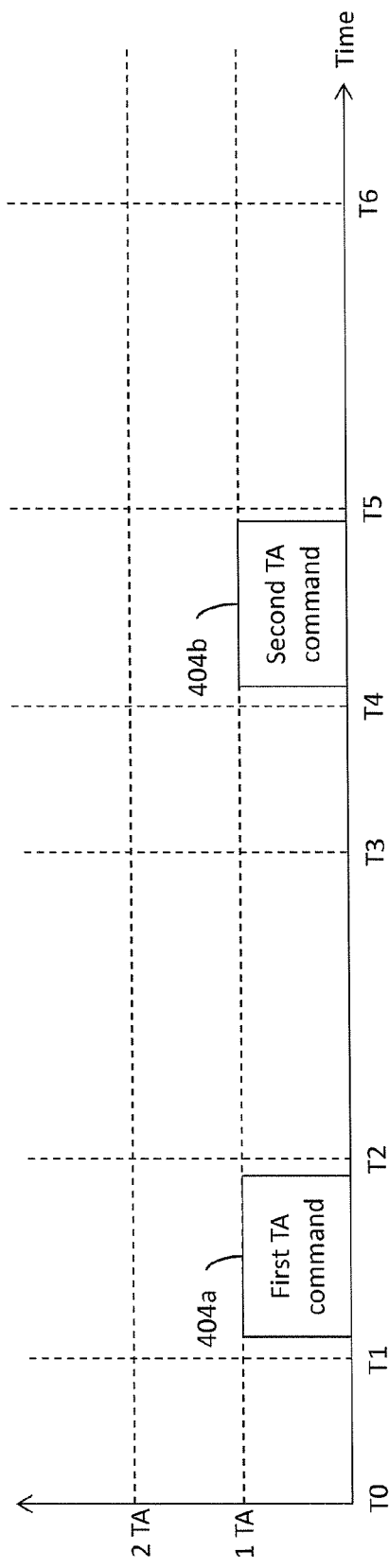
FIG. 4A
FIG. 4B

SYSTEM FOR ALIGNMENT OF RF SIGNALS

BACKGROUND

The present invention generally relates to radio-frequency (RF) communication networks, and, more particularly, to a system for alignment of transmission times of multiple RF signals transmitted by a user equipment to an RF transceiver.

A RF communication network includes a plurality of RF communication systems, such as base transceiver stations (BTSs) and user equipments (UEs). The BTS and UEs communicate using RF signals. The RF communication network may conform to specific standards and technologies like long term evolution (LTE), LTE advanced (LTE-A), high speed packet access (HSPA), and other third generation partnership project (3GPP) standards. In LTE, the BTS is referred to as an eNode-B (or eNB). The eNB includes a RF transceiver for transmitting and receiving the RF signals to and from the UEs. The RF transceiver modulates a carrier wave by changing at least one of the characteristics of the carrier wave, viz. amplitude, frequency and phase based on a digital baseband signal and then transmits the digital baseband signal using the modulated carrier wave on a transmission medium using an antenna.

The eNB communicates with multiple UEs simultaneously by transmitting RF signals on multiple RF sub-carrier frequencies that are modulated over an operating carrier frequency. The eNB uses Orthogonal Frequency-Division Multiple Access (OFDMA) to distinguish between the RF signals received from the UEs. In OFDMA, each UE is assigned a set of RF sub-carriers and a set of sub-frames for transmitting the RF signals to the eNB on the assigned set of RF sub-carriers. The eNB further assigns a time offset value to each UE that is indicative of a specific time at which the RF signals transmitted by the UE (hereinafter referred to as uplink RF signals) are expected to be received at the eNB. The UE transmits the RF signals in the assigned set of sub-frames on the assigned set of RF sub-carriers.

However, in an LTE cell, the UEs can be located at varying distances from the eNB. The RF signals transmitted by the UE to the eNB are subject to an uplink propagation delay based on the distance of the UE from the eNB. Therefore, the propagation delays for the uplink RF signals transmitted by the UEs differ based on the distance of each UE from the eNB. Similarly, the RF signals transmitted by the eNB to the UE are subjected to a downlink propagation delay. The uplink and downlink propagation delays are collectively termed as a round-trip propagation delay. To align the uplink RF signals transmitted by different UEs with the specific time at the eNB, the round-trip propagation delay must be compensated for such that the uplink RF signals from the UEs arrive at the specified time at the eNB. When the uplink RF signals from a first UE arrive at a time other than their specified time, then the RF signals will arrive at the eNB in the set of sub-frames assigned to another UE, which may result in a loss of information transmitted by the UEs.

The UEs transmit reference signals to the eNB such as a sounding reference signal (SRS) and a demodulation reference signal (DMRS). The eNB calculates a specific time alignment value for each UE based on the timing of these reference signals. The time alignment value is a time offset between transmission time of the uplink RF signals and a desired transmission time of the uplink RF signals. Thus, the time alignment values are indicative of a change in a transmission time offset of the uplink RF signals that is required for aligning the uplink RF signals with a predetermined uplink time offset computed by the eNB. The eNB transmits a time alignment command that includes the time alignment value to the UE in downlink sub-frames to compensate for the round-trip propagation delay.

The UE adjusts the time offset of the uplink RF signals based on the received time alignment value after a predetermined count of sub-frames. In an LTE-based RF communication network, the count of sub-frames after which the UE adjusts the time offset of the uplink RF signals is determined by the LTE specification standard. For example, the UE may adjust the time offset of the uplink RF signals after receiving six sub-frames subsequent to reception of the time alignment value from the eNB. However, there is a possibility that the UE will receive additional time alignment values in the six sub-frames that the UE receives after receiving the time alignment value. For example, the UE may accumulate the time alignment value and the additional time alignment values to determine a cumulative time alignment value. Further, after receiving six sub-frames after receiving the time alignment value from the eNB, the UE may determine a time period corresponding to the cumulative time alignment value and adjust the time offset of the uplink RF signals based on the determined time period.

For example, when the cumulative time alignment value exceeds a default time alignment value, the UE will advance the uplink RF signals by the time period corresponding to the cumulative time alignment value. The default time alignment value is the time alignment value that indicates that the uplink RF signals are aligned to the predetermined uplink time offset transmitted by the eNB and that the adjustment to the transmission time of the uplink RF signals is not required. Similarly, when the cumulative time alignment value is less than the default time alignment value, the UE will delay the uplink RF signals by the time period corresponding to the cumulative time alignment value. For example, for the LTE-based RF communication network, the default time alignment value is thirty-one. Hence, for the cumulative time alignment value of thirty-two, the UE advances the uplink RF signals by a time period corresponding to "1TA" and for the cumulative time alignment value of thirty, the UE delays the uplink RF signals by a time period corresponding to "1TA". In one example, 1TA is 0.5208 microseconds.

Referring to FIG. 1A, a timing diagram illustrating a plurality of sub-frames of an RF signal received by a UE from a conventional eNB is shown. The UE receives a plurality of sub-frames 102a-102f from the eNB. The sub-frames 102a-102d received during a time period N0-N4 include time alignment (TA) commands 104a-104d. Each TA command of the TA commands 104a-104d is indicative of a TA value of thirty-two. The TA value of thirty-two corresponds to 1TA. The sub-frames 102e and 102f received during the time period N4-N6 do not include any TA command.

Referring now to FIG. 1B, a graph illustrating an accumulated TA value corresponding to the TA commands 104a-104d received by the UE in the sub-frames 102a-102d, respectively, is shown. Initially, the UE receives the TA command 104a in the sub-frame 102a. The TA value corresponding to the TA command 104a is thirty-two, which indicates that the UE requires advancement of the transmission time of the uplink RF signals by 1TA for aligning the uplink RF signals with the predetermined uplink time offset computed by the eNB. However, as per the LTE standard, the UE adjusts the time offset of the uplink RF signals at time N6 after receiving the TA command 104a. Since the UE does not adjust the time offset of the uplink RF signals before time N6, the time offset of the uplink RF signals is unchanged for the time period N0-N4, and hence, the eNB transmits the TA commands 104b-104d indicative of the time advance of 1TA each in the transmission time of the uplink RF signals. Therefore, the UE accumulates the TA commands 104a-104d received during the time period N0-N6 to determine a cumulative TA value. The cumulative TA value equals a sum of the accumulated TA commands, i.e., the cumulative value is 4TA. The cumulative TA value of 4TA indicates that the uplink RF signals require time advancement of 4TA. Hence, at time N6, the UE advances the uplink RF signals by 4TA. Therefore, the UE advances the transmission time of the uplink RF signals by 4TA instead of advancing the transmission time of the uplink RF signals by 1TA as indicated initially by the TA command 104a, resulting in over compensation of the time offset of the uplink RF signals and misalignment of the uplink RF signals received at the eNB. Further, to compensate for the misalignment of the RF signals at the eNB, the eNB sends successive TA commands (not shown) in subsequent subframes (not shown) to the UE indicative of a delay in the transmission time of the uplink RF signals for aligning the time offset of the uplink RF signals with the predetermined uplink time offset computed by the eNB. Hence, the UE enters a state of oscillation between misaligned start positions of sub-frames of the RF signals, and therefore, loses synchronization with the eNB.

Referring now to FIG. 2A, a timing diagram illustrating a plurality of sub-frames of an RF signal received by another UE from another conventional eNB is shown. The UE receives a plurality of sub-frames 202a-202f from the eNB. The sub-frames 202b and 202c include TA commands 204a and 204b, respectively. The TA command 204a is indicative of a TA value of thirty-four and the TA command 204b is indicative of the TA value of thirty-two. The TA value of thirty-four corresponds to 3TA and the TA value of thirty-two corresponds to 1TA.

FIG. 2B is a graph illustrating an accumulated TA value corresponding to the TA commands 204a and 204b received by the UE in the sub-frames 202b and 202c, respectively. Initially, the UE receives the TA command 204a in the sub-frame 202b. The TA value corresponding to the TA command 204a is thirty-four, thereby indicating that the UE requires advancement of the transmission time of the uplink RF signals by 3TA for aligning the uplink RF signals with the predetermined uplink time offset computed by the eNB. However, the UE adjusts the time offset of the uplink RF signals at time N6 after receiving the TA command 204a. Hence, the eNB further transmits the TA command 204b indicative of further time advance of 1TA in the transmission time of the uplink RF signals. The UE accumulates the TA commands 204a and 204b received during the time period N0-N6 to determine a cumulative TA value of 4TA. At time N6, the UE advances the transmission time of the uplink RF signals by 4TA, thereby resulting in a loss of synchronization with the eNB.

One known way to overcome this loss of synchronization problem requires calculation of a first estimate of the time offset of the uplink RF signals by the eNB based on a reference RF signal transmitted by the UE. The eNB further calculates multiple estimates of the time offset based on the reference RF signals transmitted by the UE. The UE accumulates the received estimates of the time offset and generates a cumulative time offset estimate. The UE compares the cumulative time offset estimate with a predetermined threshold value. If the cumulative time offset estimate exceeds the threshold value, then the UE determines that synchronization with the eNB is lost and initiates a coarse synchronization procedure. During the coarse synchronization procedure, the UE searches for primary and secondary synchronization signals transmitted by the eNB. The threshold value is calculated by the UE based on a cyclic prefix of the RF signals. Hence, the technique does not provide any facility for an operator to modify the threshold value. Further, the technique does not provide any way to avoid the loss of synchronization.

Another known technique to overcome the loss of synchronization problem includes the use of a time alignment timer in the UE. The UE initializes the time alignment timer when the UE receives a TA command from the eNB. The timer runs for a preset time period and then expires. When the timer expires, the UE initiates a random access procedure to obtain uplink synchronization. During the random access procedure, the UE transmits a random access preamble to the eNB. Further, the UE reinitializes the time alignment timer after receiving another TA command after the random access procedure. A finite time period is required for performing the random access procedure. Since this technique requires the UE to perform the random access procedure multiple times, a large amount of time is consumed in performing the random access procedure, thereby reducing the efficiency of the UE.

In yet another known technique to overcome the aforementioned problem in a global system of mobile communication (GSM) based RF communication network, the UE receives and stores the TA command transmitted by a base station (hereinafter referred to as "BTS") during an initial synchronization procedure. The UE detects a relative movement of the UE with respect to the BTS to determine whether the UE is stationary mode or in motion. The technique uses a global positioning system (GPS) unit for the detection of the relative movement. Alternatively, an accelerometer or measurement of the timing of the RF signals transmitted by the BTS can be used to determine the relative movement of the UE with respect to the BTS. When the UE is stationary, the UE transmits the uplink RF signals with the time offset indicated by the stored TA command. When the UE is in motion, it initiates a random access procedure to receive another TA command from the BTS. However, because the UE is configured as a default to operate in the stationary mode, it changes back to the moving mode only when a specified number of attempts to transmit the uplink RF signals have failed. Hence, the technique requires a specified number of failed attempts before re-initiating the random access procedure, which reduces the performance of the UE.

Therefore, it would be advantageous to have a more efficient system for time alignment of RF signals in an RF communication network.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 1A is a timing diagram illustrating a plurality of sub-frames of a RF signal received by a UE from a conventional eNB;

FIG. 1B is a graph illustrating an accumulated time alignment (TA) value corresponding to a plurality of TA commands received by the UE of FIG. 1A from the conventional eNB of FIG. 1A;

FIG. 4A is a timing diagram illustrating a plurality of sub-frames transmitted to a UE by a RF transceiver in accordance with an embodiment of the present invention;

FIG. 4B is a graph illustrating a plurality of values of a plurality of TA commands transmitted to the UE of FIG. 4A by the RF transceiver of FIG. 4A in accordance with an embodiment of the present invention.

DETAILED DESCRIPTION

Figure 2A:
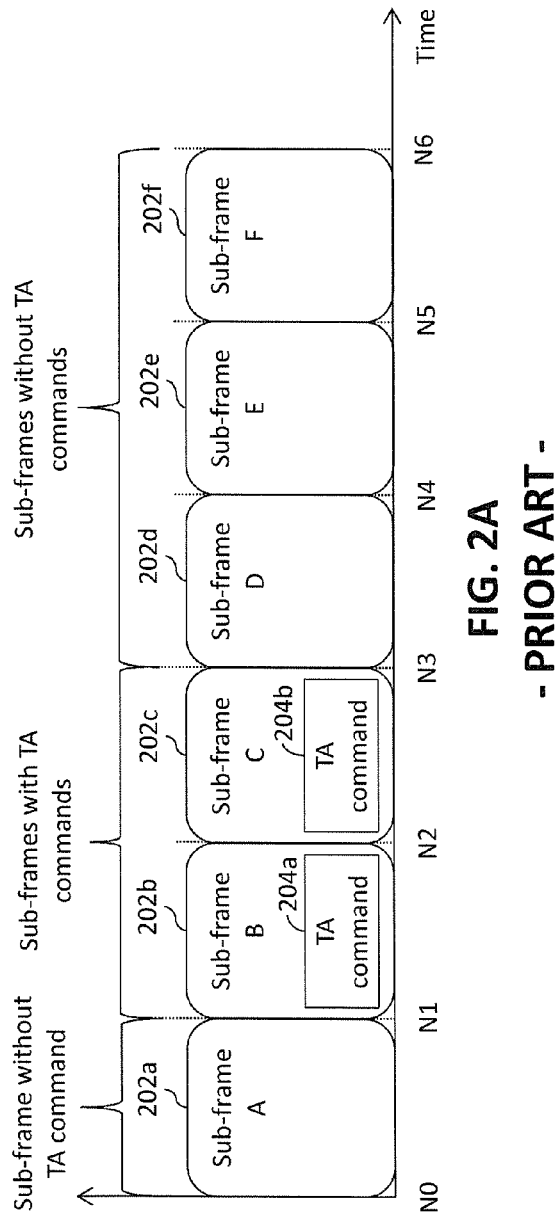
FIG. 2A is a timing diagram illustrating a plurality of sub-frames of a radio-frequency (RF) signal received by a UE from another conventional eNB.
Figure 2B:
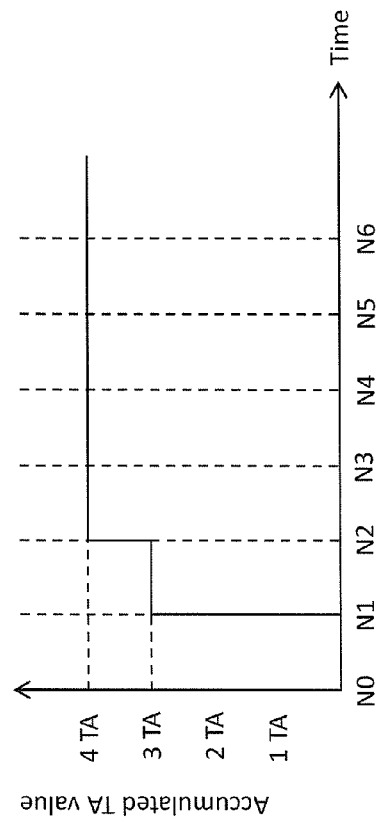
FIG. 2B is a graph illustrating an accumulated time alignment (TA) value corresponding to a plurality of TA commands received by the UE of FIG. 2A from the conventional eNB of FIG. 2A.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a radio-frequency (RF) transceiver in an RF communication network for aligning a time offset of a plurality of RF signals with a predetermined uplink timing of the RF transceiver is provided. The RF signals are transmitted to the RF transceiver by a plurality of user equipments (UEs). The RF transceiver comprises first and second system memories and first and second processors. The first system memory stores a cool-off period value, a filter period value, a reset interval value, a first filter value, and a primary threshold value. The cool-off period value is indicative of a time required by at least one of the UEs to modify the time offset of the RF signals. The first processor retrieves the cool-off period value, the filter period value, the reset interval value, the first filter value, and the primary threshold value from the first system memory. The first processor receives a time offset value indicative of the time offset of the RF signals and generates a control signal indicative of transmission of the time offset value to the at least one UE. The second processor receives the cool-off period value, the filter period value, the reset interval value, the first filter value, and the primary threshold value from the first processor. The second processor further receives a digital baseband signal corresponding to the RF signals. The second processor generates a second filter value based on the first filter value and generates first and second threshold values based on the primary threshold value and a default time offset value. The second processor initializes a filter start counter for generating a filter length value and initializes a filter span counter when the filter length value exceeds the cool-off period value for generating a filter span value. The filter span value exceeds the filter period value after a first time period after initialization of the filter span counter. The filter span value exceeds the reset interval value after a second time period subsequent to the first time period. The second processor generates an instantaneous time offset value based on the digital baseband signal during the first and second time periods, modifies the time offset value based on the instantaneous time offset value and the first and second filter values during the first and second time periods, transmits the default time offset value as the time offset value to the first processor during the first time period, transmits the modified time offset value as the time offset value to the first processor based on the first and second threshold values during the second time period, receives the control signal from the first processor during the second time period, and transmits the modified time offset value to the at least one UE based on the control signal during the second time period. Further, the second processor resets the filter start and filter span counters and the modified time offset value after the second time period.

In another embodiment of the present invention, a method for aligning a time offset of a plurality of RF signals with a predetermined uplink timing of an RF transceiver is provided. The RF signals are transmitted to the RF transceiver by a plurality of UEs. The RF transceiver includes first and second processors. The method includes receiving a cool-off period value, a filter period value, a reset interval value, a first filter value, a primary threshold value, and a digital baseband signal corresponding to the RF signals. The cool-off period value is indicative of a time required by at least one of the UEs to modify the time offset of the RF signals. The method further includes generating a second filter value based on the first filter value and generating first and second threshold values based on the primary threshold value and a default time offset value.

A filter start counter is initialized for generating a filter length value and a filter span counter is initialized when the filter length value exceeds the value of the cool-off period for generating a filter span value. The filter span value exceeds the filter period value after a first time period and the filter span value exceeds the reset interval value after a second time period subsequent to the first time period. An instantaneous time offset value is generated based on the digital baseband signal during the first and second time periods. A time offset value is modified based on the instantaneous time offset value and the first and second filter values during the first and second time periods. The default time offset value is transmitted as the time offset value by the second processor to the first processor during the first time period. The modified time offset value is transmitted as the time offset value by the second processor to the first processor based on the first and second threshold values during the second time period.

The method further includes receiving the time offset value indicative of the time offset of the RF signals at the first processor. A control signal indicative of transmission of the time offset value to the at least one UE is generated. The control signal is received at the second processor during the second time period. The modified time offset value is transmitted to the at least one UE. The filter start and filter span counters and the modified time offset value is reset after the second time period.

Various embodiments of the present invention provide a radio-frequency (RF) transceiver in an RF communication network for aligning a time offset of a plurality of RF signals with a predetermined uplink timing of the RF transceiver. The RF signals are transmitted to the RF transceiver by a plurality of UEs. The first processor retrieves a cool-off period value, a filter period value, a reset interval value, a first filter value, and a primary threshold value from a first system memory. The cool-off period value is indicative of a time required by at least one of the UEs to modify the time offset of the plurality of RF signals. Subsequently, the first processor receives a time offset value indicative of the time offset of the plurality of RF signals and generates a control signal indicative of transmission of the time offset value to the at least one UE. The second processor receives a digital baseband signal corresponding to the plurality of RF signals, generates a second filter value based on the first filter value and generates first and second threshold values based on the primary threshold value and a default time offset value, and initializes a filter start counter for generating a filter length value and initializes a filter span counter when the filter length value exceeds the cool-off period value for generating a filter span value. The filter span value exceeds the filter period value after a first time period after the initialization of the filter span counter. The filter span value exceeds the value of the reset interval after a second time period subsequent to the first time period.

The second processor generates an instantaneous time offset value based on the digital baseband signal during the first and second time periods, modifies the time offset value based on the instantaneous time offset value and the first and second filter values during the first and second time periods, transmits the default time offset value as the time offset value to the first processor during the first time period, transmits the modified time offset value as the time offset value to the first processor based on the first and second threshold values during the second time period, receives the control signal from the first processor during the second time period, and transmits the modified time offset value to the at least one UE based on the control signal during the second time period. Further, the second processor initializes the filter start counter after the resetting of the filter start and filter span counters at the end of the second time period. Subsequently, the filter length value exceeds the cool-off period value after a third time period that equals the cool-off value.

The RF transceiver provides enough time to the UE to adjust the transmission time of the uplink RF signals in the third time period. Hence, a state of oscillation of the UE between misaligned start positions of the sub-frames caused due to transmission of multiple TA commands to the UE is avoided, thereby preventing misalignment of the RF signals received at the eNB and providing optimum throughput. Further, the RF transceiver facilitates an operator to store the cool-off period value, the filter period value, the reset interval value, and the primary threshold value, thereby providing the operator a control over the RF transceiver. Thus, the RF transceiver can be programmed by the operator to suit the requirements of the RF communication network.

Figure 3:
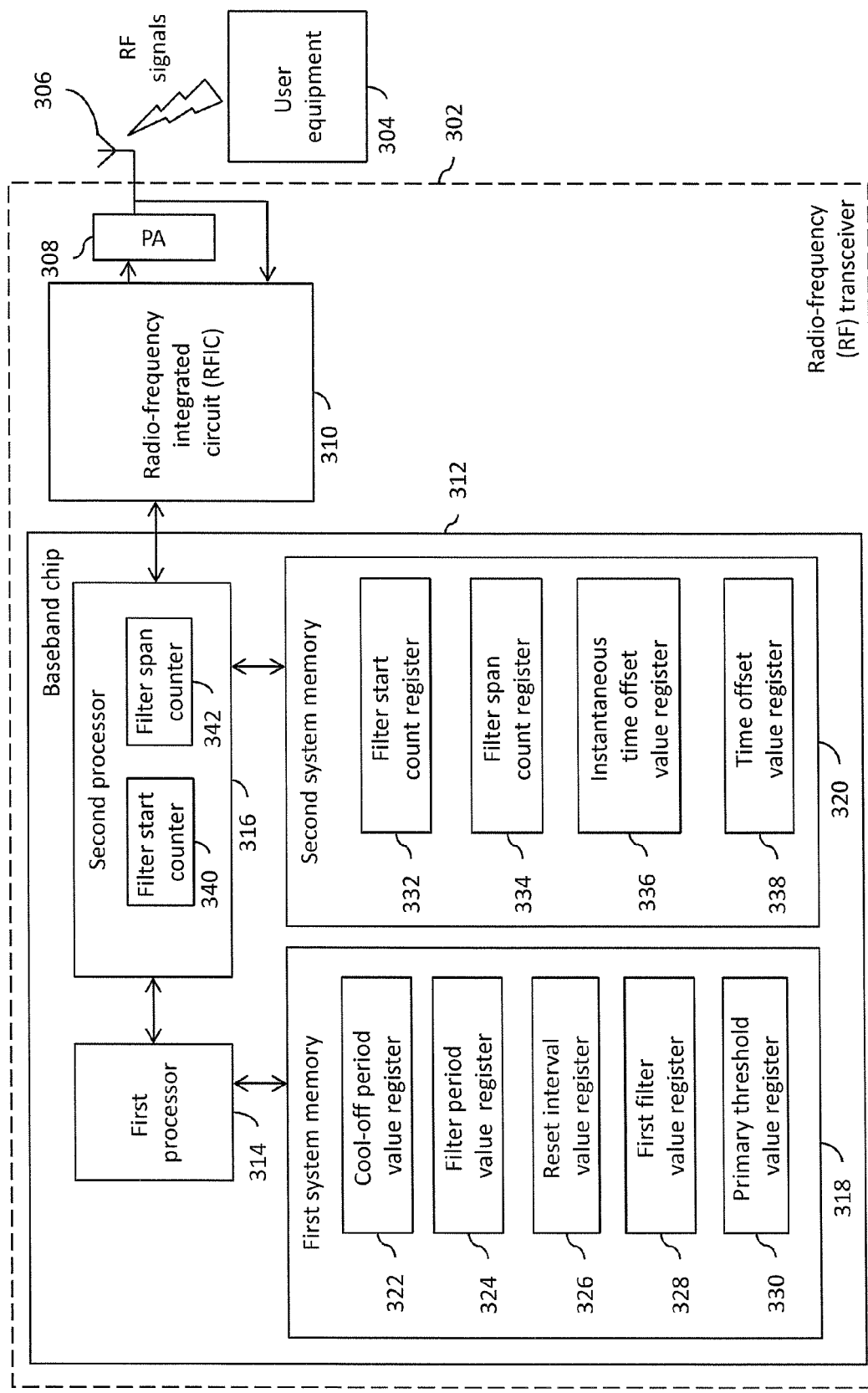
FIG. 3 is a schematic block diagram of a RF transceiver for time aligning a plurality of RF signals in accordance with an embodiment of the present invention.

Referring now to FIG. 3, a schematic block diagram of a RF transceiver 302 for aligning a time offset of a plurality of RF signals with a predetermined uplink timing (hereinafter referred to as predetermined uplink time offset) in accordance with an embodiment of the present invention is shown. The RF signals are transmitted by a UE 304 to the RF transceiver 302. The RF transceiver 302 and the UE 304 are included in an RF communication network. In one embodiment, the RF transceiver 302 is at least one of a macro-cell RF transceiver, a micro-cell RF transceiver, a pico-cell RF transceiver, and a femto-cell RF transceiver. In a preferred embodiment of the present invention, the RF transceiver 302 is an eNode-B (or "eNB") and the RF communication network is based on the LTE standard. The RF signals transmitted by the UE 304 to the RF transceiver 302 are hereinafter referred to as uplink RF signals. The time offset of the uplink RF signals is a time difference between a starting position of a sub-frame received by the UE 304 from the RF transceiver 302 and a starting position of a sub-frame transmitted to the RF transceiver 302 by the UE 304.

The RF transceiver 302 assigns a set of sub-frames at a set of RF sub-carrier frequencies to the UE 304. The RF transceiver 302 is connected to an antenna 306 for transmitting and receiving the RF signals to and from the UE 304, respectively. The RF transceiver 302 includes a power amplifier (PA) 308, a radio-frequency integrated circuit (RFIC) 310, and a baseband chip 312. The baseband chip 312 includes first and second processors 314 and 316 and first and second system memories 318 and 320.

The antenna 306 transmits and receives the RF signals to and from the UE 304, respectively. The antenna 306 is connected to the PA 308 and the RFIC 310. During the transmission of the RF signals to the UE 304, the PA 308 receives the RF signals from the RFIC 310. The PA 308 amplifies the RF signals, i.e., increases the amplitude of the RF signals and transmits the amplified RF signals to the antenna 306. The antenna 306 then transmits the amplified RF signals to the UE 304 through free space.

When the RF transceiver 302 receives the RF signals from the UE 304, the antenna 306 receives the RF signals from the UE 304 through free space and transmits the RF signals to the RFIC 310. The RFIC 310 generates a low-frequency signal based on the RF signals by way of a mixer (not shown). The RFIC 310 further generates a digital baseband signal based on the low-frequency signal by way of an analog-to-digital converter (ADC) (not shown). Hence, the digital baseband signal corresponds to the RF signals received from the UE 304. The RFIC 310 transmits the digital baseband signal to the baseband chip 312.

The first system memory 318 includes a cool-off period value register 322 for storing a cool-off period value, a filter period value register 324 for storing a filter period value, a reset interval value register 326 for storing a reset interval value, a first filter value register 328 for storing a first filter value, and a primary threshold value register 330 for storing a primary threshold value. The cool-off period value is a time required by the UE 304 for modifying the time offset of the uplink RF signals.

The first processor 314 is connected to the first system memory 318 and the second processor 316. The first processor 314 retrieves and transmits the cool-off period value, the filter period value, the reset interval value, the first filter value, and the primary threshold value from the first system memory 318 to the second processor 316. The first processor 314 performs layer 2 processing of a wireless protocol stack. In one embodiment, the first processor 314 is an LTE layer 2 (L2) processor. The first processor 314 receives a time offset value from the second processor 316. Further, the first processor 314 enables an operator to store the cool-off period value, the filter period value, the reset interval value, the first filter value, and the primary threshold value in the cool-off period value register 322, the filter period value register 324, the reset interval value register 326, the first filter value register 328, and the primary threshold value register 330, respectively. In another embodiment, the first processor 314 executes software stored in the first system memory 318. The software enables an operator to program the cool-off period value, the filter period value, the reset interval value, the first filter value, and the primary threshold value by executing the computer readable program code on the first processor 314. Further, the software enables the operator to control the generation of time offset values transmitted to the UE 304.

The second system memory 320 is connected to the second processor 316. The second system memory 320 includes a filter start count register 332 for storing a filter length value, a filter span count register 334 for storing a filter span value, an instantaneous time offset value register 336 for storing an instantaneous time offset value, and a time offset value register 338 for storing the time offset value.

The second processor 316 includes a filter start counter 340 and a filter span counter 342. The second processor 316 receives the cool-off period value, the filter period value, the reset interval value, the first filter value, and the primary threshold value from the first processor 314 and the digital baseband signal from the RFIC 310. The second processor 316 performs layer 1 (L1) processing of the wireless protocol stack. In one embodiment, the second processor 316 is an LTE L1 processor. The second processor 316 generates a second filter value based on the value of the first filter, and generates first and second threshold values based on the primary threshold value.

In one embodiment, the second processor 316 generates the second filter value by subtracting the first filter value from unity as given by equation (1) below:

Second filter value=1−first filter value (1)

The second processor 316 generates the first threshold value by adding the primary threshold value to a default time offset value as given by equation (2) below:

First threshold value=default time offset value+primary threshold value (2)

Further, the second processor 316 generates the second threshold value by subtracting the primary threshold value from the default time offset value as given by equation (3) below:

Second threshold value=default time offset value−primary threshold value (3)

The second processor 316 initializes the filter start counter 340 for generating the filter length value. The second processor 316 stores the filter length value in the filter start count register 332. In one embodiment, the second processor 316 increments the filter length value and stores the incremented filter length value in the filter start count register 332. The second processor 316 monitors the filter length value and initializes the filter span counter 342 when the filter length value exceeds the cool-off period value.

The filter span counter 342 generates the filter span value. The second processor 316 stores the filter span value in the filter span count register 334. In one embodiment, the second processor 316 increments the filter span value and stores the incremented filter span value in the filter span count register 334. The incremented filter span value exceeds the filter period value after a first time period. The filter span value exceeds the reset interval value after a second time period subsequent to the first time period.

During the first time period, the second processor 316 generates the instantaneous time offset value based on the digital baseband signal corresponding to the uplink RF signals received from the UE 304. In one embodiment, the UE 304 transmits a reference RF signal to the RF transceiver 302 and the digital baseband signal corresponds to the reference RF signal transmitted by the UE 304. The examples of the reference RF signals include a sounding reference signal (SRS) and a demodulation reference signal (DMRS). The second processor 316 generates and modifies the time offset value based on the instantaneous time offset value and the first and second filter values. The first and second filter values are indicative of first and second weights assigned to the time offset value and the instantaneous time offset value, respectively, for generating the modified time offset value. In one embodiment, the modified time offset value is a sum of a product of the first filter value and the time offset value and a product of the second filter value and the instantaneous time offset value as given by equation (4) below:

Modified time offset value=(time offset value*first filter value)+(instantaneous time offset value*second filter value) (4)

The second processor 316 overwrites the time offset value and stores the modified time offset value in the time offset value register 338. However, during the first time period, the second processor 316 transmits a default time offset value to the first processor 314. The default time offset value indicates that the uplink RF signals from the UE 304 are aligned to the predetermined uplink time offset computed by the RF transceiver 302. In an example, the default time offset value is thirty-one. The time offset value greater than the default time offset value is indicative of advancement in the transmission time of the uplink RF signals. Similarly, the time offset value less than the default time offset value is indicative of a delay in the transmission time of the uplink RF signals. Hence, for the time offset value of thirty-two, the UE 304 advances the uplink RF signals and for the time offset value of thirty, the UE 304 delays the uplink RF signals. In one embodiment, each sub-frame has a time period of 1 msec.

During the second time period, the second processor 316 receives the digital baseband signal from the RFIC 310. The second processor 316 modifies the instantaneous time offset value based on the received digital baseband signal. The second processor 316 then stores the modified instantaneous time offset value in the instantaneous time offset value register 336. The second processor 316 modifies the time offset value based on the instantaneous time offset value and the first and second filter values as shown in equation (4) and stores the modified time offset value in the time offset value register 338.

The second processor 316 checks to determine whether the modified time offset value is less than the first threshold value and greater than the second threshold value. The first and second threshold values are indicative of maximum and minimum values of the time offset value, respectively. The first threshold value is indicative of a maximum permitted advance in transmission time of the uplink RF signals transmitted by the UE 304. The second threshold value is indicative of a maximum permitted delay in transmission time of the uplink RF signals transmitted by the UE 304. Hence, the first and second threshold values collectively determine an allowable time offset window that restricts the modification range for the time offset of the transmission time of the uplink RF signals. The allowable time offset window includes a predefined set of time offset values. Thus, the time offset values transmitted to the UE 304 are confined to the time offset values within the allowable time offset window. In one embodiment, the operator adjusts the allowable time offset window by configuring the primary threshold value stored in the primary threshold value register 330.

If the second processor 316 determines that the modified time offset value is less than the first threshold value and greater than the second threshold value, the second processor 316 transmits the modified time offset as the time offset value to the first processor 314. However, if the second processor 316 determines that the modified time offset value exceeds the first threshold value, the second processor 316 transmits the first threshold value as the time offset value to the first processor 314. However, if the second processor 316 determines that the modified time offset value is less than the second threshold value, the second processor 316 transmits the second threshold value as the time offset value to the first processor 314.

During the second time period, the first processor 314 receives the time offset value and generates a control signal based on the time offset value. The control signal is indicative of transmission of the time offset value to the UE 304. In one embodiment, the control signal is indicative of the time offset value that is transmitted to the UE 304 by the RF transceiver 302. The second processor 316 receives the control signal and transmits the time offset value to the UE 304 based on the control signal. The second processor 316 transmits the time offset value to the UE 304 in a time alignment (TA) command transmitted to the UE 304. The TA command is transmitted to the UE 304 in a sub-frame on another downlink RF carrier signal during the second time period.

When the filter span value exceeds the reset interval value, the second processor 316 resets the filter start and filter span counters 340 and 342 and the modified time offset value. The second processor 316 resets the filter start and filter span counters 340 and 342 by storing a zero value in the filter start count register 332 and the filter span count register 334. Further, the second processor 316 resets the time offset value by storing the default time offset value in the time offset value register 338. Subsequently, the second processor 316 initializes the filter start counter 340 to generate the filter length value. The filter length value exceeds the cool-off period value after a third time period. Thus, the third time period equals the time required by the UE 304 to modify the time offset of the uplink RF signals. In an example, the third time period equals the cool-off period value.

Referring now to FIG. 4A, a timing diagram illustrating a plurality of sub-frames transmitted to the UE 304 by the RF transceiver 302 in accordance with an embodiment of the present invention is shown. The UE 304 receives a first set of sub-frames 402a in the time period T0-T1, a second set of sub-frames 402b in the time period T1-T2, and a third set of sub-frames 402c in the time period T2-T3. Further, the UE 304 receives a fourth set of sub-frames 402d in the time period T3-T4 subsequent to receiving the third set of sub-frames 402c in the time period T2-T3. The UE 304 receives a fifth set of sub-frames 402e in the time period T4-T5 subsequent to the time period T3-T4, and a sixth set of sub-frames 402f in the time period T5-T6 subsequent to the time period T4-T5. The time periods T0-T1 and T3-T4 correspond to the first time period. The time periods T1-T2 and T4-T5 correspond to the second time period. The time periods T2-T3 and T5-T6 correspond to the third time period. A first sub-frame (not shown) of the second set of sub-frames 402b includes a first TA command 404a and a second sub-frame (not shown) within the fifth set of sub-frames 402e includes a second TA command 404b.

Referring now to FIG. 4B, a graph illustrating a plurality of values of the first and second TA commands 404a and 404b in accordance with an embodiment of the present invention is shown. In an example, the first and second TA commands 404a and 404b include value thirty-two. Hence, the first and second TA commands 404a and 404b correspond to the advancement in the transmission time of the uplink RF signals by a time interval corresponding to 1TA.

In operation, the second processor 316 receives the reset interval value, the filter period value, the cool-off period value, the first filter value and the primary threshold value from the first processor 314 and the digital baseband signal from the RFIC 310. The second processor 316 generates the second filter value based on the first filter value and generates the first and second threshold values based on the primary threshold value as shown in equations (1), (2), and (3), respectively. The second processor 316 initializes the filter start counter 340 to generate the filter length value. At time T0, the filter length value exceeds the cool-off period value and the second processor 316 initializes the filter span counter 342 to generate the filter span value. At time T1, the filter span value exceeds the filter period value after the time period T0-T1 (hereinafter referred to as first time period T0-T1).

During the first time period T0-T1, the second processor 316 generates the instantaneous time offset value based on the digital baseband signal. The second processor 316 then generates and modifies the time offset value based on the instantaneous time offset value and the first and second filter values as shown in equation (4). However, the second processor 316 transmits the default time offset value as the time offset value to the first processor 314. Further, the second processor 316 transmits the first set of sub-frames 402a to the UE 304.

During the time period T1-T2 (hereinafter referred to as second time period T1-T2), the second processor 316 generates and modifies the instantaneous time offset value based on the digital baseband signal. The second processor 316 then modifies the time offset value based on the instantaneous time offset value and the first and second filter values as shown in equation (4). When the modified time offset value exceeds the first threshold value, the second processor 316 transmits the first threshold value as the time offset value to the first processor 314. When the modified time offset value is less than the second threshold value, the second processor 316 transmits the second threshold value as the time offset value to the first processor 314. When the modified time offset value is less than the first threshold value and exceeds the second threshold value, the second processor 316 transits the modified time offset value as the time offset value to the first processor 314. At time T2, the filter span value exceeds the reset interval value after the second time period T1-T2.

The first processor 314 receives at least one of the modified time offset and the first and second threshold values as the time offset value, generates the control signal based on the time offset value, and transmits the control signal to the second processor 316. The second processor 316 receives the control signal and transmits the modified time offset value to the UE 304 in the first TA command 404a. At time T2, the filter span value exceeds the reset interval value and the second processor 316 resets the filter start counter 340, the filter span counter 342, and the modified time offset value and initializes the filter start counter 340 to generate the filter length value. At time T3, the filter length value exceeds the cool-off period value.

Hence, the RF transceiver 302 provides adequate time to the UE 304 to adjust the transmission time of the uplink RF signals during the time period T2-T3 (hereinafter referred to as third time period T2-T3) based on the first TA command 404a, thereby avoiding a state of oscillation of the UE 304 between misaligned start positions of the sub-frame caused due to multiple TA commands transmitted in successive sub-frames. Thus, misalignment of the RF signals received at the eNB is prevented, thereby increasing the throughput of the eNB. Further, the cool-off period value, the filter period value, the reset interval value, the first filter value, and the primary threshold value are programmable by the operator, thereby providing the operator a control over the generation and transmission of the first and second TA commands 404a and 404b. The software executed by the first processor 314 enables the operator to control time intervals of the first, second and third time periods, thereby providing flexibility to the operators to program the first processor 314 based on the requirements of the RF communication system.

Referring now to FIGS. 5A, 5B, 5C, and 5D, a flow chart illustrating a method for aligning the time offset of the plurality of RF signals transmitted by the UE 304 to the RF transceiver 302 with the predetermined uplink time offset in accordance with an embodiment of the present invention is shown.

Figure 5A:
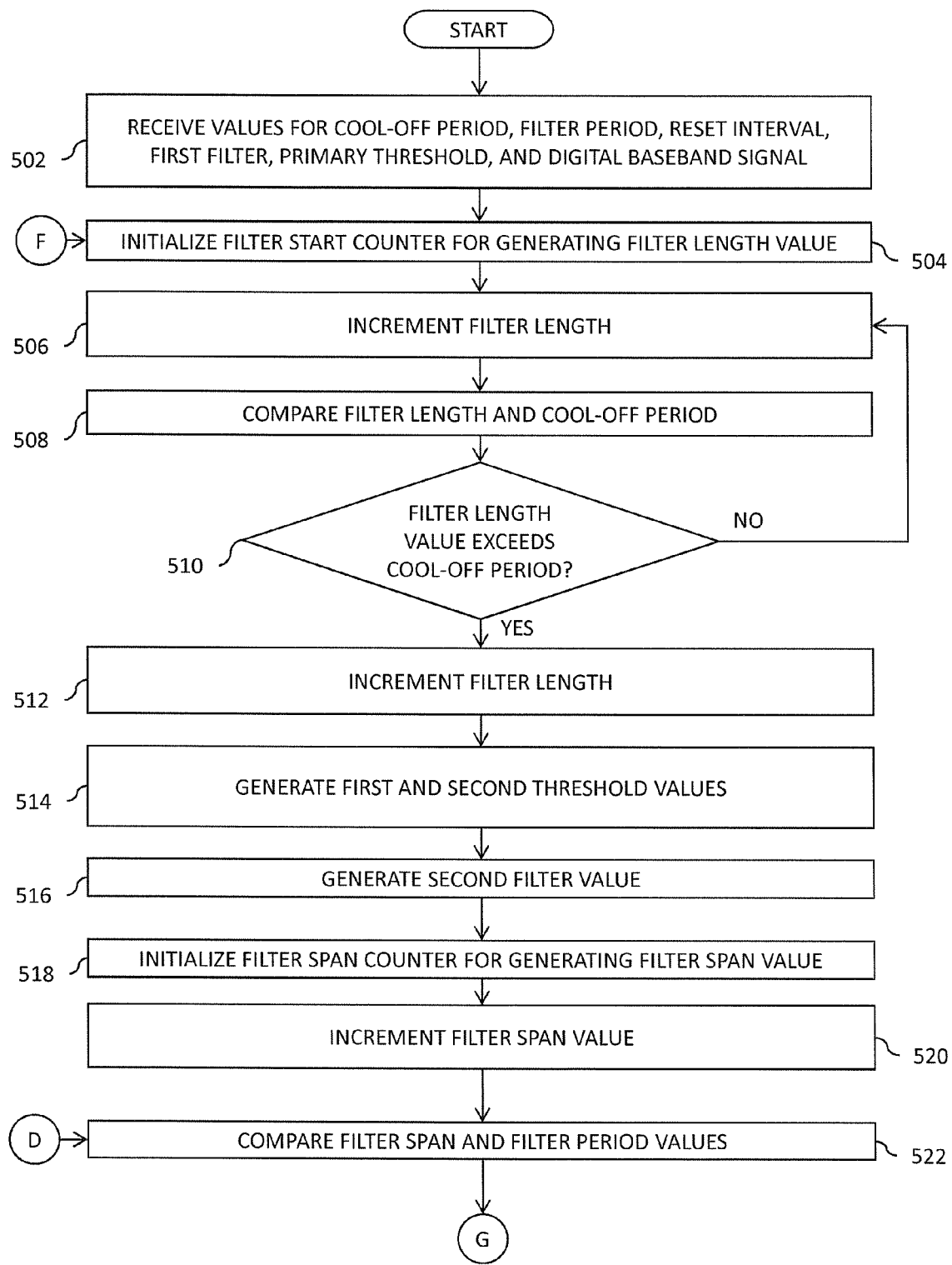
FIGS. 5A, 5B, 5C, 5D and 5E are a flow chart illustrating a method for aligning a time offset of a plurality of RF signals in accordance with an embodiment of the present invention.

Referring now to FIG. 5A, at step 502, the second processor 316 receives the cool-off period value, the filter period value, the reset interval value, the first filter value, and the primary threshold value from the first processor 314 and the digital baseband signal from the RFIC 310. At step 504, the second processor 316 initializes the filter start counter 340 for generating the filter length value. At step 506, the second processor 316 increments the filter length value and stores the incremented filter length value in the filter start count register 332. At step 508, the second processor 316 compares the filter length value and the cool-off period value. At step 510, the second processor 316 checks to determine whether the filter length value exceeds the cool-off period value. If at step 510 the second processor 316 determines that the filter length value does not exceed the cool-off period value, the second processor 316 executes step 506. However, if at step 510 the second processor 316 determines that the filter length value exceeds the cool-off period value, the second processor 316 executes step 512. At step 512, the second processor 316 increments the filter length value and stores the incremented filter length value in the filter start count register 332. At step 514, the second processor 316 generates the first and second threshold values based on the primary threshold value as shown in equations (2) and (3). At step 516, the second processor 316 generates the second filter value based on the first filter value as shown in equation (1). At step 518, the second processor 316 initializes the filter span counter 342 for generating the filter span value. At step 520, the second processor 316 increments the filter span value and stores the incremented filter span value in the filter span count register 334. At step 522, the second processor 316 compares the filter span value and the filter period value. The second processor 316 executes step 524 after executing step 522.

Figure 5B:
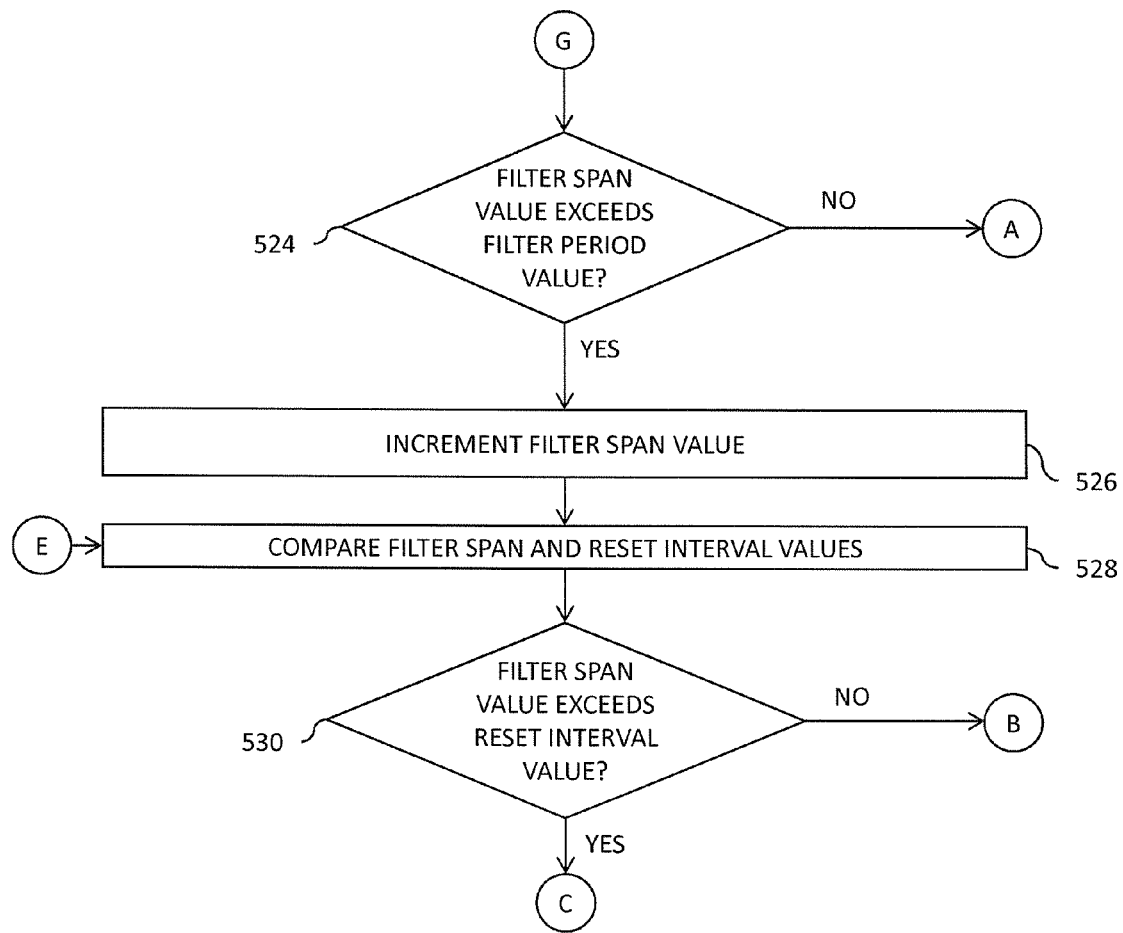

Referring now to FIG. 5B, at step 524, the second processor 316 checks to determine whether the filter span value exceeds the filter period value. If at step 524, the second processor 316 determines that the filter span value does not exceed the filter period value, the second processor 316 executes step 532. However, if at step 524 the second processor 316 determines that the filter span value exceeds the filter period value, the second processor 316 executes step 526. At step 526, the second processor 316 increments the filter span value and stores the incremented filter span value in the filter span count register 334. At step 528, the second processor 316 compares the filter span value and the reset interval value. At step 530, the second processor 316 checks to determine whether the filter span value exceeds the reset interval value. If at step 530 the second processor 316 determines that the filter span value does not exceed the reset interval value, the second processor 316 executes step 540. However, if at step 530 the second processor 316 determines that the filter span value exceeds the reset interval value, the second processor 316 executes step 556.

Figure 5C:
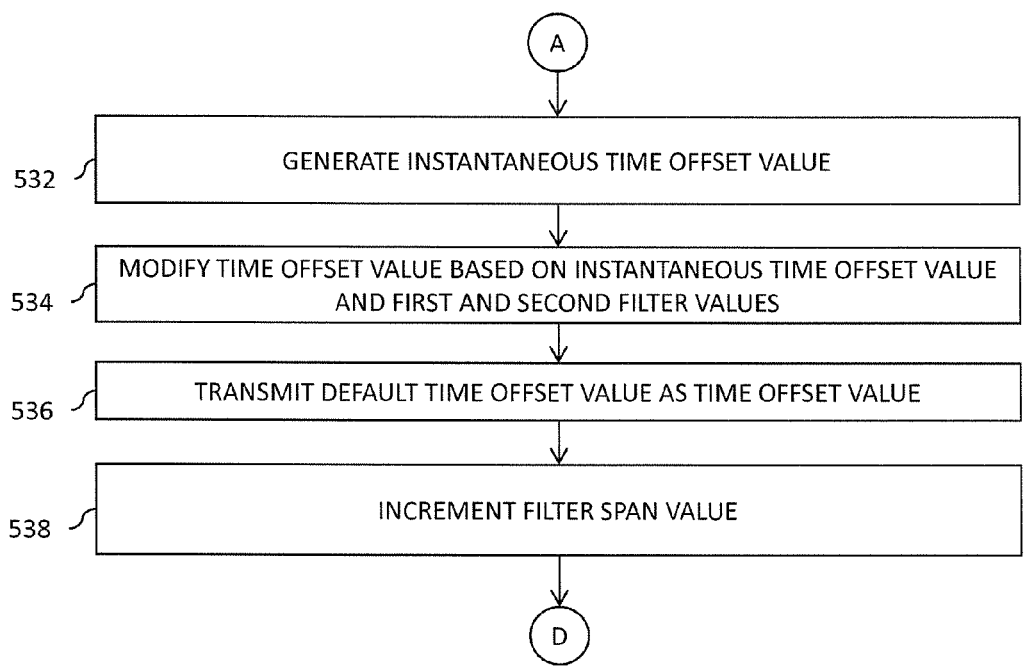

Referring now to FIG. 5C, at step 532, the second processor 316 generates the instantaneous time offset value based on the digital baseband signal. At step 534, the second processor 316 generates and modifies the time offset value based on the instantaneous time offset value and the first and second filter values as shown in equation (4). At step 536, the second processor 316 transmits the default time offset value as the time offset value to the first processor 314. At step 538, the second processor 316 increments the filter span value and stores the incremented filter span value in the filter span count register 334. The second processor 316 executes step 522 after executing step 538.

Figure 5D:
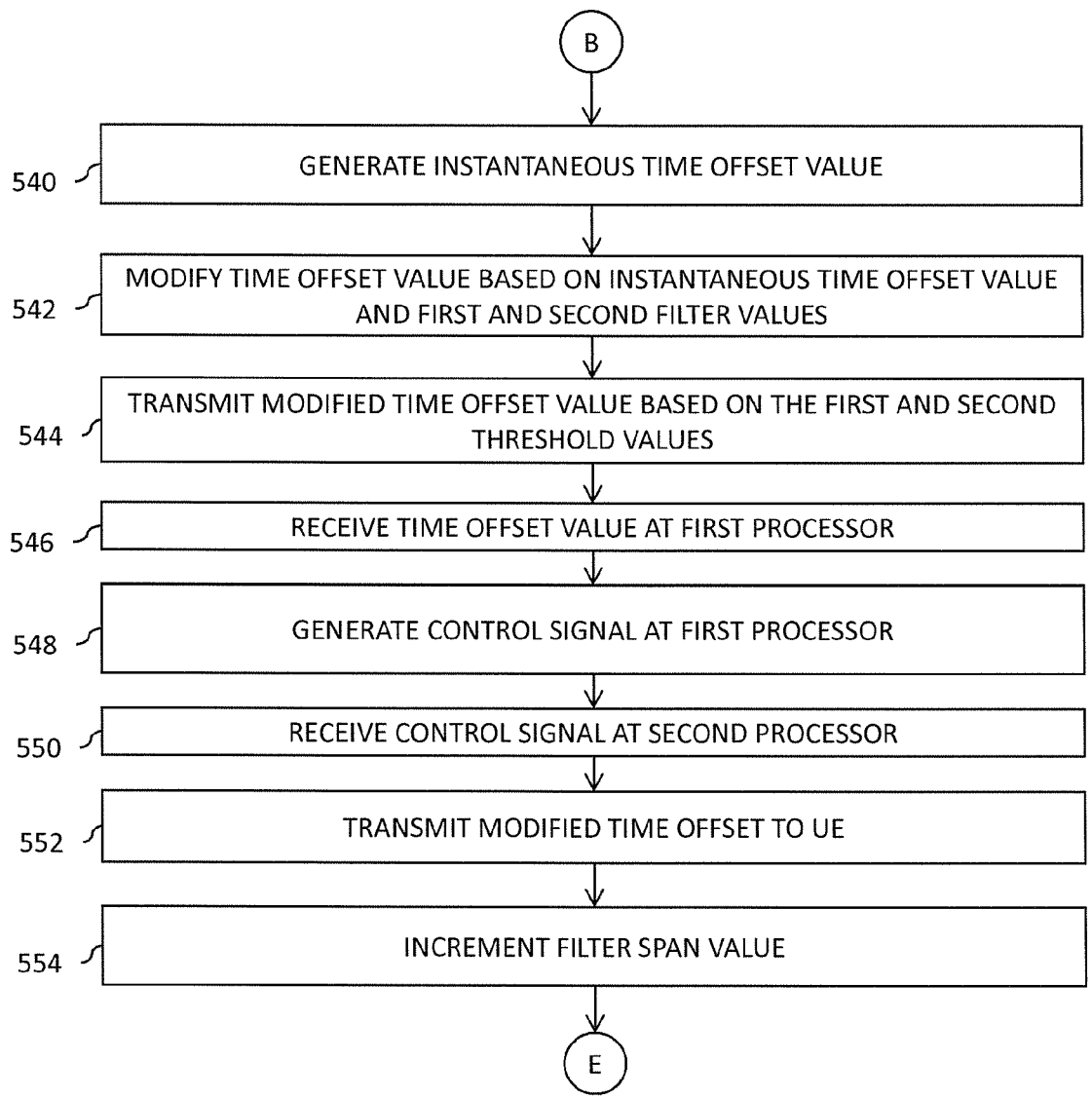

Referring now to FIG. 5D, at step 540, the second processor 316 generates the instantaneous time offset value based on the digital baseband signal. At step 542, the second processor 316 modifies the time offset value based on the instantaneous time offset value and the first and second filter values as shown in equation (4). At step 544, the second processor 316 transmits the modified time offset value as the time offset value to the first processor 314 based on the first and second threshold values. At step 546, the first processor 314 receives the time offset value. At step 548, the first processor 314 generates the control signal based on the time offset value. At step 550, the second processor 316 receives the control signal. At step 552, the second processor 316 transmits the modified time offset value to the UE 304 based on the control signal. At step 554, the second processor 316 increments the filter span value and stores the incremented filter span value in the filter span count register 334. The second processor 316 executes step 528 after executing step 554.

Figure 5E:
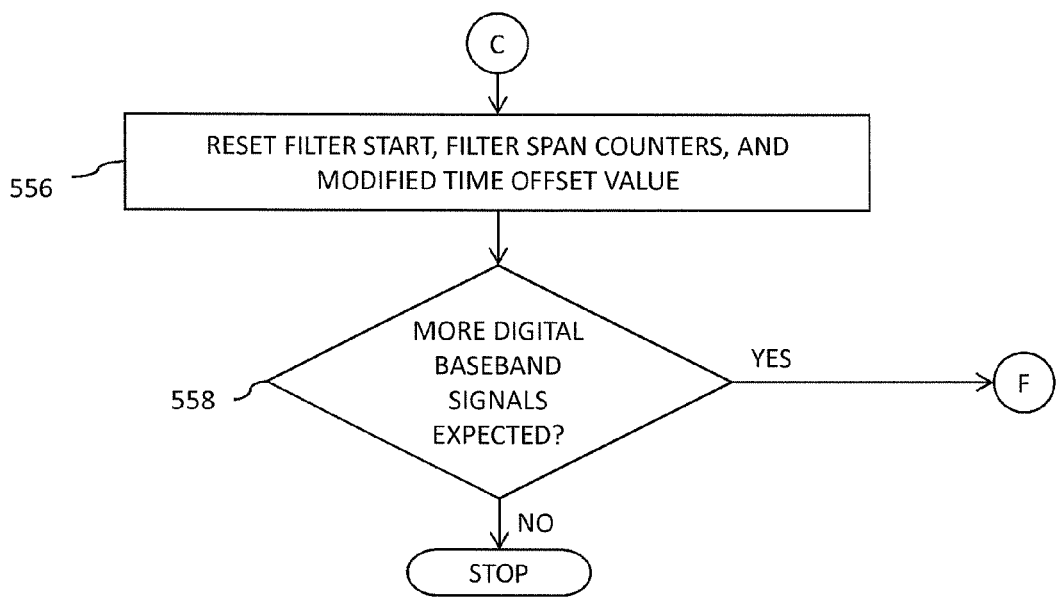

Referring now to FIG. 5E, at step 556, the second processor 316 resets the filter start and filter span counters 340 and 342, respectively, and the modified time offset value. At step 558, the second processor 316 checks to determine whether any more digital baseband signals are expected to be received. If at step 558, the second processor 316 determines that there are more digital baseband signals to be received, the second processor 316 executes step 504. In one embodiment, the RF transceiver 302 expects to receive more digital baseband signals when the RF transceiver 302 is in a working state and the RF transceiver 302 does not expect to receive more digital baseband signals when the RF transceiver 302 is in a standby state. In another embodiment, the RF transceiver 302 does not expect to receive more digital baseband signals when the RF transceiver 302 is switched off.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A radio-frequency (RF) transceiver in an RF communication network for aligning a time offset of a plurality of RF signals with a predetermined uplink timing of the RF transceiver, wherein the plurality of RF signals are transmitted to the RF transceiver by a plurality of user equipments (UEs), the RF transceiver comprising:

a first system memory for storing values of a cool-off period, a filter period, a reset interval, a first filter, and a primary threshold, wherein the cool-off period value is indicative of a time required by at least one of the UEs to modify the time offset of the plurality of RF signals;

a first processor, connected to the first system memory, for retrieving the values of the cool-off period, the filter period, the reset interval, the first filter, and the primary threshold from the first system memory, receiving a time offset value indicative of the time offset of the plurality of RF signals, and generating a control signal indicative of transmission of the time offset value to the at least one UE; and a second processor connected to the first processor, wherein the second processor is arranged for:
  receiving the values of the cool-off period, the filter period, the reset interval, the first filter, and the primary threshold from the first processor,
  receiving a digital baseband signal corresponding to the plurality of RF signals,
  generating a second filter value based on the first filter value,
  generating values of first and second thresholds based on the primary threshold value and a default time offset value,
  initializing a filter start counter for generating a filter length value,
  initializing a filter span counter when the filter length value exceeds the value of the cool-off period for generating a filter span value, wherein the filter span value exceeds the value of the filter period after a first time period after the initialization of the filter span counter, and wherein the filter span value exceeds the value of the reset interval after a second time period subsequent to the first time period,
  generating an instantaneous time offset value based on the digital baseband signal during the first and second time periods,
  modifying the time offset value based on the instantaneous time offset value and the values of the first and second filters during the first and second time periods,
  transmitting the default time offset value as the time offset value to the first processor during the first time period,
  transmitting the modified time offset value as the time offset value to the first processor based on the values of the first and second thresholds during the second time period,
  receiving the control signal from the first processor during the second time period,
  transmitting the modified time offset value to the at least one UE based on the control signal during the second time period, and
  resetting the filter start and filter span counters and the modified time offset value after the second time period.

2. The RF transceiver of claim 1, wherein the second processor further is arranged to initialize the filter start counter after the resetting of the filter start and filter span counters.

3. The RF transceiver of claim 2, wherein the filter length value exceeds the cool-off period value after a third time period after the initialization of the filter start counter, and wherein the third time period equals the time required by the at least one UE to modify the time offset of the plurality of RF signals.

4. The RF transceiver of claim 1, wherein the values of the first and second thresholds are indicative of maximum and minimum values of the time offset value, respectively, and wherein the first threshold value is a sum of the default time offset value and the primary threshold value, and the second threshold value is a difference between the default time offset value and the primary threshold value.

5. The RF transceiver of claim 4, wherein the second processor transmits the time offset value to the first processor based on the first and second threshold values during the second time period by (i) transmitting the first threshold value as the time offset value when the modified time offset value exceeds the first threshold value, (ii) transmitting the second threshold value as the time offset value when the modified time offset value is less than the second threshold value, and (iii) transmitting the modified time offset value as the time offset value when the modified time offset value exceeds the second threshold value and is less than the first threshold value.

6. The RF transceiver of claim 1, further comprising a second system memory connected to the second processor, wherein the second system memory includes:
  a filter start count register for storing the filter length value generated by the filter start counter;
  a filter span count register for storing the filter span value generated by the filter span counter;
  an instantaneous time offset value register for storing the instantaneous time offset value; and
  a time offset value register for storing the time offset value and the modified time offset value.

7. The RF transceiver of claim 6, wherein the second processor further stores the modified time offset value as the time offset value in the time offset value register during the first and second time periods.

8. The RF transceiver of claim 1, wherein the second processor resets the filter start and filter span counters after the second time period by storing a zero value in the filter start count register and the filter span count register, and wherein the second processor resets the modified time offset value by storing the default time offset value in the time offset value register.

9. The RF transceiver of claim 1, wherein the first and second filter values are indicative of first and second weights assigned to the time offset value and the instantaneous time offset value, respectively, for generating the modified time offset value.

10. The RF transceiver of claim 1, wherein the first processor performs layer 2 processing of a wireless protocol stack, and the second processor performs layer 1 processing of the wireless protocol stack.

11. A method for aligning a time offset of a plurality of radio-frequency (RF) signals with a predetermined uplink timing of an RF transceiver, wherein the plurality of RF signals are transmitted to the RF transceiver by a plurality of user equipments (UEs), and wherein the RF transceiver includes first and second processors, the method comprising:
  receiving values of a cool-off period, a filter period, a reset interval, a first filter, a primary threshold, and a digital baseband signal corresponding to the plurality of RF signals, wherein the cool-off period value is indicative of a time required by at least one of the UEs to modify the time offset of the plurality of RF signals, and wherein the cool-off period value, the filter period value, the reset interval value, the first filter value, and the primary threshold value are configurable by the first processor;

generating a second filter value based on the first filter value;

generating values of first and second thresholds based on the primary threshold value and a default time offset value;

initializing a filter start counter for generating a filter length value;

initializing a filter span counter when the filter length value exceeds the value of the cool-off period for generating a filter span value, wherein the filter span value exceeds the value of the filter period after a first time period after the initialization of the filter span counter, and wherein the filter span value exceeds the value of the reset interval after a second time period subsequent to the first time period;

generating an instantaneous time offset value based on the digital baseband signal during the first and second time periods;

modifying a time offset value based on the instantaneous time offset value and the values of the first and second filters during the first and second time periods;

transmitting the default time offset value as the time offset value by the second processor to the first processor during the first time period;

transmitting the modified time offset value as the time offset value by the second processor to the first processor based on the first and second threshold values during the second time period;

receiving the time offset value indicative of the time offset of the plurality of RF signals at the first processor;

generating a control signal indicative of transmission of the time offset value to the at least one UE;

receiving the control signal at the second processor during the second time period;

transmitting the modified time offset value to the at least one UE based on the control signal during the second time period; and resetting the filter start and filter span counters and the modified time offset value after the second time period.

12. The method of claim 11, further comprising initializing the filter start counter after the resetting of the filter start and filter span counters.

13. The method of claim 12, wherein the filter length value exceeds the cool-off period value after a third time period subsequent to the initialization of the filter start counter, and wherein the third time period equals the time required by the at least one UE to modify the time offset of the plurality of RF signals.

14. The method of claim 11, wherein the values of the first and second thresholds are indicative of maximum and minimum values of the time offset value, respectively, and wherein the first threshold value is a sum of the default time offset value and the primary threshold value, and the second threshold value is a difference between the default time offset value and the primary threshold value.

15. The method of claim 14, further comprising:

transmitting the first threshold value as the time offset value by the second processor to the first processor when the modified time offset value exceeds the first threshold value during the second time period;

transmitting the second threshold value as the time offset value by the second processor to the first processor when the modified time offset value is less than the second threshold value during the second time period; and transmitting the modified time offset value as the time offset value by the second processor to the first processor when the modified time offset value is greater than the second threshold value and less than the first threshold value during the second time period.

16. The method of claim 15, further comprising:

storing the filter length value in a filter start count register;

storing the filter span value in a filter span count register;

storing the instantaneous time offset value in an instantaneous time offset value register; and storing the time offset value and the modified time offset value in a time offset value register.

17. The method of claim 16, further comprising storing the modified time offset value as the time offset value in the time offset value register during the first and second time periods.

18. The method of claim 11, wherein the filter start and filter span counters are reset after the second time period by storing a zero value in the filter start count register and the filter span count register, and wherein the modified time offset value is reset by storing the default time offset value in the time offset value register.

19. The method of claim 11, wherein the first and second filter values are indicative of first and second weights assigned to the time offset value and the instantaneous time offset value, respectively, for generating the modified time offset value.

20. The method of claim 11, wherein the first processor performs layer 2 processing of a wireless protocol stack, and wherein the second processor performs layer 1 processing of the wireless protocol stack.

* * * * *